United States Patent [19] [11] Patent Number: 4,988,971
Anderson, III [45] Date of Patent: Jan. 29, 1991

[54] SUPERCONDUCTING TEMPERATURE CONTROLLER

[75] Inventor: Edward K. Anderson, III, Auburndale, Fla.

[73] Assignee: Progress Technologies Corporation, St. Petersburg, Fla.

[21] Appl. No.: 301,430

[22] Filed: Jan. 26, 1989

[51] Int. Cl.⁵ .................. H01L 43/00; H01L 39/00
[52] U.S. Cl. .................................. 338/32 S; 374/176
[58] Field of Search ............... 338/32 S, 18; 374/174, 374/176, 178, 179; 165/30

[56] References Cited

U.S. PATENT DOCUMENTS

| 2,189,122 | 2/1940 | Andrews | 374/176 X |
| 3,155,157 | 11/1964 | Anderson et al. | 165/30 |
| 3,704,391 | 11/1972 | McConnell | 338/32 S X |
| 4,134,447 | 1/1979 | Jennings et al. | 165/30 |
| 4,464,065 | 8/1984 | Wolf et al. | 338/18 X |

OTHER PUBLICATIONS

Liebenberg et al., "Thin-Film Superconductors as Sensitive Thermometers", Journal of Applied Physics, vol. 41, No. 10, Sep. 1970, pp. 4050-4053.

Primary Examiner—Bruce A. Reynolds
Assistant Examiner—M. M. Lateef
Attorney, Agent, or Firm—Cushman, Darby & Cushman

[57] ABSTRACT

A superconducting temperature controller that can sense the temperature of an area and also heat the enclosed area. A superconducting thin film resistor mounted on a substrate is disposed in an enclosed housing that forms a vacuum. Also disposed within the housing is a heat sink that keeps the temperature inside the housing below the transition temperature of the superconducting material that forms the thin film resistor. By applying a constant voltage to the thin film resistor, the temperature of the substrate and thin film resistor can be maintained at a predetermined level that is within the transition temperature region of the superconducting material being used.

10 Claims, 3 Drawing Sheets

FIG. 1
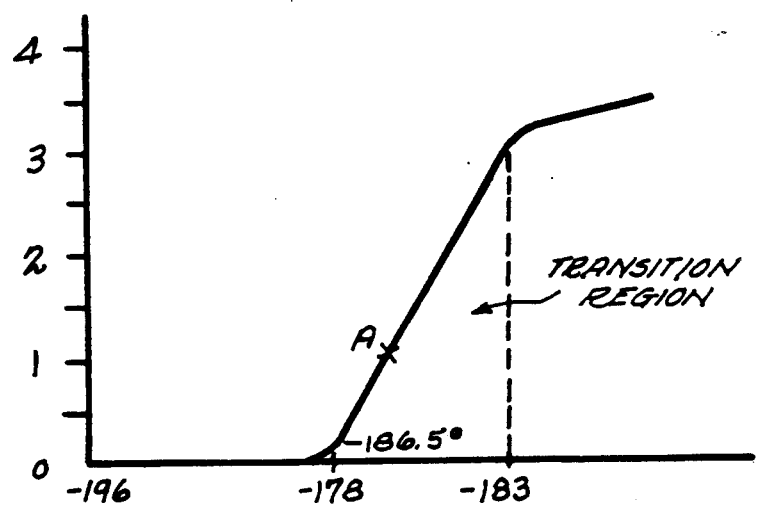
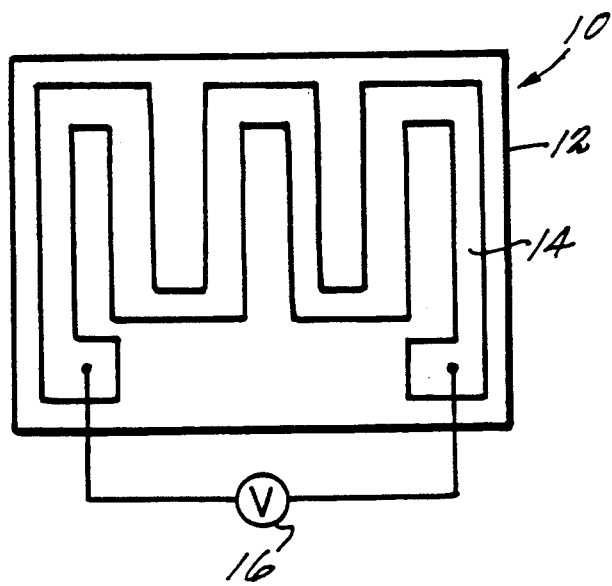

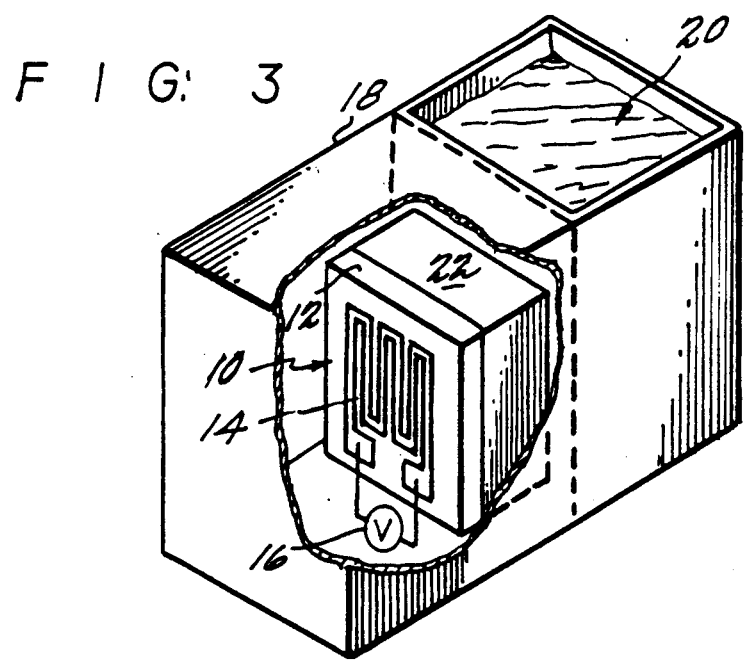
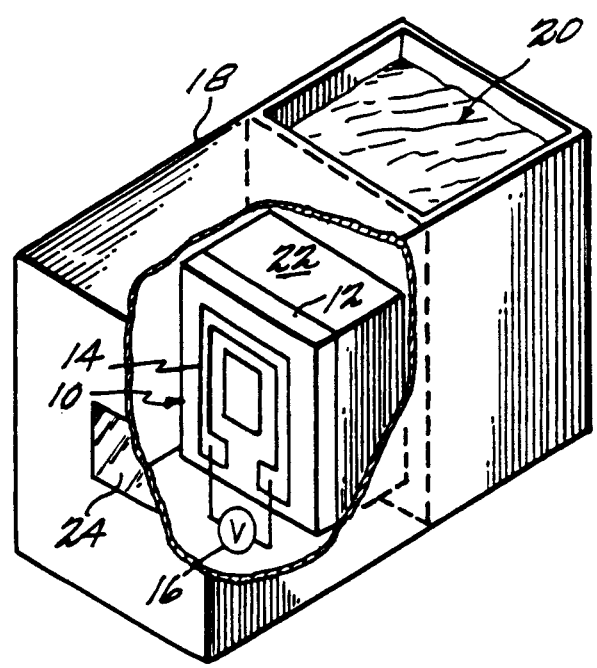
FIG. 3

SUPERCONDUCTING TEMPERATURE CONTROLLER

BACKGROUND OF THE INVENTION

1. The Field of the Art.

The present invention relates to a device for controlling the temperature of an enclosed area at a predetermined temperature, and, more specifically, to the use of a thin film resistor made of a superconducting material that acts as both temperature sensor and a heater.

2. Description of the Prior Art.

Many different types of temperature controllers are known. For low temperature applications that use a heat sink, a detector usually measures the temperature for the area of interest. The output of the detector is then input, through conversion circuitry, to a heating element that maintains the temperature of the area within a certain range. The use of a separate detector and heating element requires this conversion circuitry, which can add cost and decrease sensitivity.

A controller is known that incorporates the sensing element and the heating element into a single device. U.S. Pat. No. 3,155,157 uses a resistive bridge circuit that senses the temperature and also serves as a heating element within an enclosed area. However, the sensitivity of the bridge circuit is rather low and difficult to maintain. Furthermore, conversion circuitry that detects and A.C. error nulling signal is also required.

Thus, a temperature controller that does not contain conversion circuitry and has an element that acts as both a temperature sensor and a heating element is needed.

SUMMARY OF THE INVENTION

It is an object of the present invention to provide a superconducting temperature controller that has a single element that acts as both a temperature sensor and a heating element.

It is another object of the present invention to provide a superconducting thin film resistor that is both a temperature sensor and a heating element.

It is a further object of the present invention to provide a temperature controller that can maintain the temperature of an area very accurately within the transition temperature range of the superconducting material being used.

In order to attain the above recited objects of the invention, among others, the present invention includes a substrate on which is disposed a thin film resistor made of superconducting material. When placed in an enclosed area containing a heat sink that maintains the temperature lower than the transition temperature of the superconducting material, some constant voltage applied to the superconducting thin film resistor will maintain the temperature of the area within a very narrow temperature range.

Thus, by choosing the appropriate superconducting material and applied voltage, the temperature of the enclosed area can be sensitively regulated to many different temperatures.

BRIEF DESCRIPTION OF THE DRAWINGS

These and other advantages of the present invention may be appreciated from studying the following detailed description of the preferred embodiment together with the drawings in which:

FIG. 1 illustrates the resistance characteristics of a superconducting material with respect to changing temperature;

FIG. 2 illustrates the superconducting temperature controller of the present invention;

FIG. 3 illustrates one application of the superconducting temperature controller of present invention as a temperature controller for an enclosed area;

FIG. 4 illustrates another application of the superconducting temperature controller as a temperature controller in an enclosed area having a separate detector that detects incident radiation.

DETAILED DESCRIPTION OF THE PREFERRED EMBODIMENT

Figure 5:
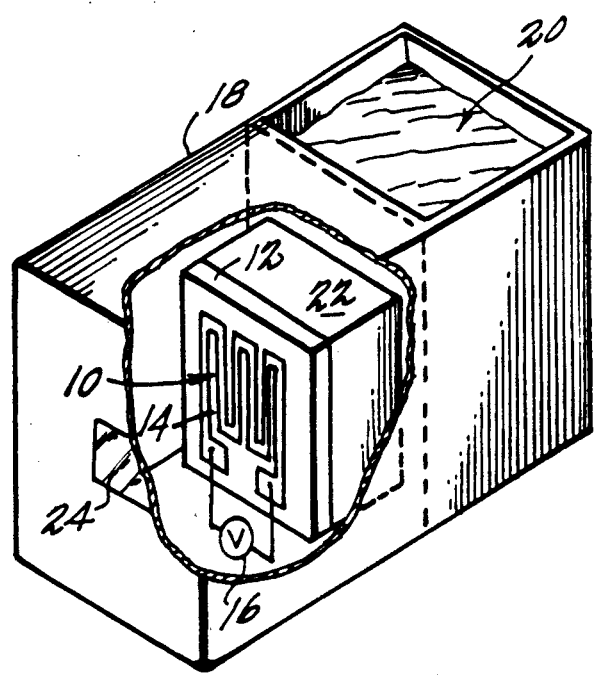
FIG. 5 illustrates the superconducting temperature controller also being used to detect incident radiation.

FIG. 1 illustrates the change in resistance of a typical superconducting material for changing temperatures. Below a certain temperature, the superconducting material has no resistance as long as electrical currents are kept below a critical value. Above this temperature is a temperature range that defines a transition region. Above the transition region, the superconducting material has primarily resistive characteristics. The present invention uses the large variation in resistance in the transition region to sense a changing temperature and heat the surrounding area to maintain a constant temperature.

FIG. 2 illustrates superconducting temperature controller 10. Substrate 12, which can be any material compatible with thin film superconductor fabrication processes, such as strontium titanate ($SrTiO_3$), sapphire ($Al_2O_3$), or zirconia ($ZrO_2$), has attached a superconducting thin film resistor 14 made of superconducting material. Connected to superconducting thin film resistor 14 is a voltage source 16 that delivers a constant voltage to superconducting thin film resistor 14.

FIG. 3 illustrates the use of superconducting temperature controller 10 to maintain the temperature of an enclosed surface area at a predetermined temperature within the transition region of the superconducting material used to make superconducting thin film resistor 14, such as $-186.5°$ shown at "A" in FIG. 1.

Superconducting temperature controller 10 is disposed within an enclosed housing 18 that maintains a vacuum in the interior. Housing 18 contains a heat sink 20 that uses, for example, a liquid that maintains a constant and predictable temperature as it evaporates, such as liquid nitrogen, oxygen, or helium. This establishes the temperature inside housing 18 below the transition temperature of the superconducting material that makes up superconducting thin film resistor 14. A thermal resistance mass 22 is attached at one face to heat sink 20 and at the opposite face to substrate 12. Many materials and thicknesses of thermal resistance mass 22 can be used. If a solid, liquid or gas is used for thermal resistance mass 22, conduction predominates. If an empty space is used for thermal resistance mass 22, radiation predominates. Layered paper provides excellent characteristics.

The location of the superconducting temperature controller 10 with respect to the heat sink 20 must be constant so that a constant thermal resistance path is maintained by whatever thermal resistance mass 22 is used. The use of thermal resistance mass 22 regulates the thermal resistance path and allows the temperature to be maintained at a more constant level. Generally, the thicker the material used, the greater the sensitivity of the superconducting temperature controller 10.

In operation, a constant voltage is applied to superconducting thin film resistor 14, which causes a current to flow across superconducting thin film resistor 14. If the film is in its superconducting state, a constant voltage will produce a current in excess of the material's critical current and result in resistance heating. The current should be limited to prevent exceeding the current carrying capabilities of the material. The resulting $I^2R$ heating will drive the temperature of the superconducting thin film resistor 14 up into the transition region. Once in the transition region, power generation ($V^2/R$) in the superconducting thin film resistor 14 decreases as resistance increases. This power generation results in a temperature rise of the superconducting thin film resistor 14. This temperature rise is dissipated by heat flowing from superconducting thin film resistor 14 to its surroundings, primarily through the thermal resistance mass 22 to heat sink 20. Since this heat flow increases as temperature rises, and power generation decreases due to increasing resistance as temperature rises, a thermal balance will be reached where heat generation exactly matches heat dissipation. The result is a self temperature regulating thin film resistive heater. For each point on the temperature vs. resistance curve, there will be a precise voltage which will maintain that exact temperature.

Varying the superconducting material used for superconducting thin film resistor 14 allows many different temperatures to be controlled.

FIG. 4 illustrates superconducting temperature controller 10 being used to maintain a constant temperature for an area containing a radiation detector 26. Radiation detector 26 is used to sense incident radiation. A window 24 that is transparent to the frequency of incident radiation of interest is formed in housing 18. Incident radiation can thus cause a change in the temperature and change the resistance of radiation detector 26. The use of various types of radiation detector 26 to detect incident radiation is described in U.S. patent application Ser. Nos. 137,131 filed Dec. 23, 1987 and 137,136 filed Dec. 23, 1987 and is incorporated by reference into this application.

However, incident radiation can also change the resistance of superconducting thin film resistor 14. If the time radiation detector 26 takes to sense incident radiation is small compared to the time that it takes superconducting thin film resistor 14 to acquire the equilibrium temperature, the previously described superconducting temperature controller 10 can be used to maintain the temperature of radiation detector 26 at a constant level and then reacquire the constant temperature level after radiation is detected by radiation detector 26.

FIG. 5 illustrates that superconducting thin film resistor 14 can be used to sense the temperature of the enclosed area and sense incident radiation. The changing resistance that occurs from incident radiation can be sensed using superconducting film resistor 14. Pulsed radiation will cause a pulsed current in superconducting thin film resistor 14 and constant radiation will cause a shift in the operating point on the transition curve shown in FIG. 1. This change in operating point can be sensed using a two point probe or four point probe described in U.S. application Ser. No. 07/137,131 disposed on at least a portion of the superconducting thin film resistor 14.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

What is claimed is:

1. An apparatus for controlling temperature at a temperature above that of a heat sink comprising:
    a substrate;
    a superconducting thin film resistor made from a superconducting material having a superconducting transition temperature deposited on said substrate, said superconducting thin film resistor having a surface area that is temperature controlled;
    means for transferring thermal energy from said heat sink to said substrate; and
    means for applying a constant voltage across said thin film resistor to cause said thin film resistor to maintain a constant temperature that is within the superconducting transition temperature of said superconducting material.

2. An apparatus according to claim 1 wherein said substrate is one of strontium titanate, sapphire, and zirconia.

3. An apparatus according to claim 1 wherein said transferring means is a solid thermal resistance mass attached at one face to a side of said substrate opposite said thin film resistor and attachable at another face to said heat sink.

4. An apparatus according to claim 3 wherein said thermal resistance mass is layered paper.

5. An apparatus for maintaining a constant temperature comprising:
    a housing;
    a sink disposed in said housing that has a temperature below said constant temperature;
    a substrate disposed within said housing;
    a superconducting thin film resistor made from a superconducting material having a superconducting transition temperature deposited on said substrate, said superconducting thin film resistor having a surface area that is temperature controlled;
    means for transferring thermal energy from said heat sink to said substrate; and
    means for applying a constant voltage to said thin film resistor to cause said thin film resistor to maintain a constant temperature that is within the superconducting transition temperature of said superconducting material.

6. An apparatus according to claim 5 wherein said heat sink is a container filled with a liquid that maintains a constant and predictable temperature during evaporation.

7. An apparatus according to claim 5 wherein said substrate is one of strontium titanate, sapphire, and zirconia.

8. An apparatus according to claim 5 wherein said transferring means is a solid thermal resistance mass attached at one face to a side of said substrate opposite said thin film resistor and attached at another face to said heat sink.

9. An apparatus according to claim 8 wherein said thermal resistance mass is layered paper.

10. An appparatus according to claim 5 further including:
    a window transparent to a predetermined frequency of incident radiation disposed in said housing; and
    means for detecting incident radiation disposed on said substrate.

* * * * *